(12) United States Patent
Robinson

(10) Patent No.: US 12,543,110 B2
(45) Date of Patent: Feb. 3, 2026

(54) CELL SELECTION/RESELECTION TO BRING USER EQUIPMENT BACK TO HOME NETWORK

(71) Applicant: DISH WIRELESS L.L.C., Englewood, CO (US)

(72) Inventor: Xiaowen Robinson, Great Falls, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 510 days.

(21) Appl. No.: 18/091,854

(22) Filed: Dec. 30, 2022

(65) Prior Publication Data

US 2024/0224168 A1  Jul. 4, 2024

(51) Int. Cl.
*H04W 48/18* (2009.01)
*H04W 8/12* (2009.01)
*H04W 48/16* (2009.01)

(52) U.S. Cl.
CPC ............ *H04W 48/18* (2013.01); *H04W 8/12* (2013.01); *H04W 48/16* (2013.01)

(58) Field of Classification Search
CPC .......... H04W 48/16; H04W 8/12; H04W 8/18
USPC .......................................................... 455/434
See application file for complete search history.

(56) References Cited

U.S. PATENT DOCUMENTS

| | | | | |
|---|---|---|---|---|
| 9,155,028 | B2 * | 10/2015 | Kim ..................... | H04W 48/16 |
| 2004/0224689 | A1 * | 11/2004 | Raghuram ............ | H04W 48/16 |
| | | | | 455/435.3 |
| 2017/0055201 | A1 * | 2/2017 | Murray ................. | H04W 48/16 |
| 2020/0153576 | A1 * | 5/2020 | Lee ....................... | H04W 72/04 |

* cited by examiner

*Primary Examiner* — Chuck Huynh
(74) *Attorney, Agent, or Firm* — Seed Intellectual Property Law Group LLP

(57) ABSTRACT

Various embodiments of apparatus, systems and/or methods are described for providing cell reselection from a visiting PLMN to home PLMN in scenarios where the UE is camped to a visiting cell with an Equivalent HPLMN identity. The method may include cell reselection from one radio frequency broadcasting the Equivalent HPLMN identity to another preferred radio frequency that broadcasts only the visiting PLMN identity by leveraging frequency selection priority, and subsequent cell reselection from the visiting PLMN identity with the visiting PLMN cell to the home PLMN identity with the home PLMN cell by using high priority home PLMN identity search. The method provides a means to allow the UE to quickly come back to home PLMN when entering home coverage, otherwise the UE would have to move out of the coverage of the Equivalent HPLMN identity from the border cells of the visiting PLMN by radio refrequency rescan and selection.

20 Claims, 6 Drawing Sheets

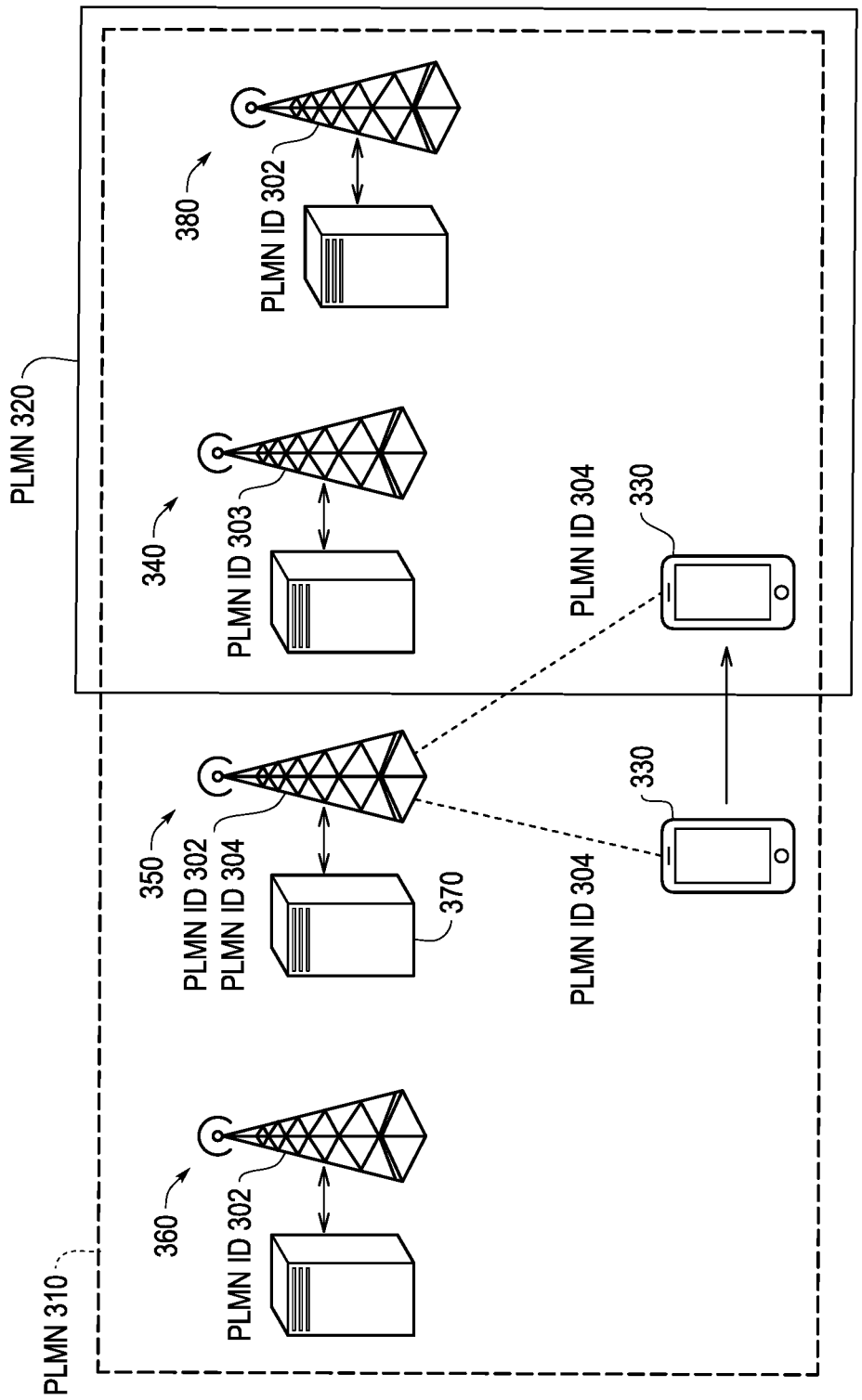

CELL SELECTION/RESELECTION TO BRING USER EQUIPMENT BACK TO HOME NETWORK

BACKGROUND

Currently, cellular devices (e.g., a mobile phone) can connect to various cellular networks, including home or roaming cellular networks. A cellular device connects to a roaming network when it connects to a cell of a roaming network operator instead of his home network operator. However, the costs that the home network operator has to pay to the roaming network operator when the cellular device is connected to the roaming network is undesired for the home network operator, especially if the cellular device has an available home network cell to connect to (i.e. in home network coverage), which could avoid the roaming fees altogether.

However, in certain scenarios even when a home network cell is available to connect to, these cellular devices stay camped on the roaming network cells. Thus, it is desirable to have a way to perform cell selection/reselection to get the mobile phone back to the network cell of the home network.

SUMMARY

Disclosed herein are embodiments of systems and methods to perform cell selection/reselection to quickly move user equipment (UE) to the UE's home Public Land Mobile Network (PLMN). Various embodiments of apparatus, systems and/or methods are described below.

According to one embodiment, a method is provided for cell selection/reselection. The method may include receiving, by user equipment (UE) comprising a processor, a broadcast from a first cell of a first Public Land Mobile Network (PLMN) identity associated with a visiting PLMN (VPLMN) and a second PLMN identity associated with a home PLMN (HPLMN); determining and selecting the first PLMN identity as a predefined preferred frequency between the first PLMN identity and the second PLMN identity on visiting network; rescanning for PLMN identities and detecting a third PLMN identity of the HPLMN; determining that the third PLMN identity has a highest priority between (1) the first PLMN identity, as the previously determined preferred frequency over the frequencies associated with the second PLMN identity, and (2) the third PLMN identity; and connecting to the third PLMN identity.

According to one embodiment, user equipment (UE) may include an antenna to connect with cells; memory; and a processor. The processor may be configured for: receiving a broadcast from a first cell of a first Public Land Mobile Network (PLMN) identity associated with a visiting PLMN (VPLMN) and a second PLMN identity associated with a home PLMN (HPLMN); determining and selecting the first PLMN identity as a predefined preferred frequency between the first PLMN identity and the second PLMN identity; rescanning for PLMN identities and detecting a third PLMN identity of the HPLMN; determining that the third PLMN identity has a highest priority between (1) the first PLMN identity, as the previously determined preferred frequency, and (2) the third PLMN identity; and connecting to the third PLMN identity.

According to one embodiment, a system may include a processor configured for: receiving a broadcast from a first cell of a first Public Land Mobile Network (PLMN) identity and a second PLMN identity; determining and selecting the first PLMN identity as a predefined preferred frequency between the first PLMN identity and the second PLMN identity; rescanning for PLMN identities and detecting a third PLMN identity of a second cell; determining that the third PLMN identity has a highest priority between (1) the first PLMN identity, as the previously determined preferred frequency, and (2) the third PLMN identity; and connecting to the third PLMN identity.

BRIEF DESCRIPTION OF THE DRAWINGS

The same number represents the same element or same type of element in all drawings.

FIG. 3 is a diagram illustrating cells assigned with different PLMN identities according to an embodiment.

DETAILED DESCRIPTION OF EMBODIMENTS

The various embodiments described herein generally provide apparatus, systems and methods for cell selection/reselection of user equipment (UE) back to a home network instead of camping on a roaming cell.

Figure 1:
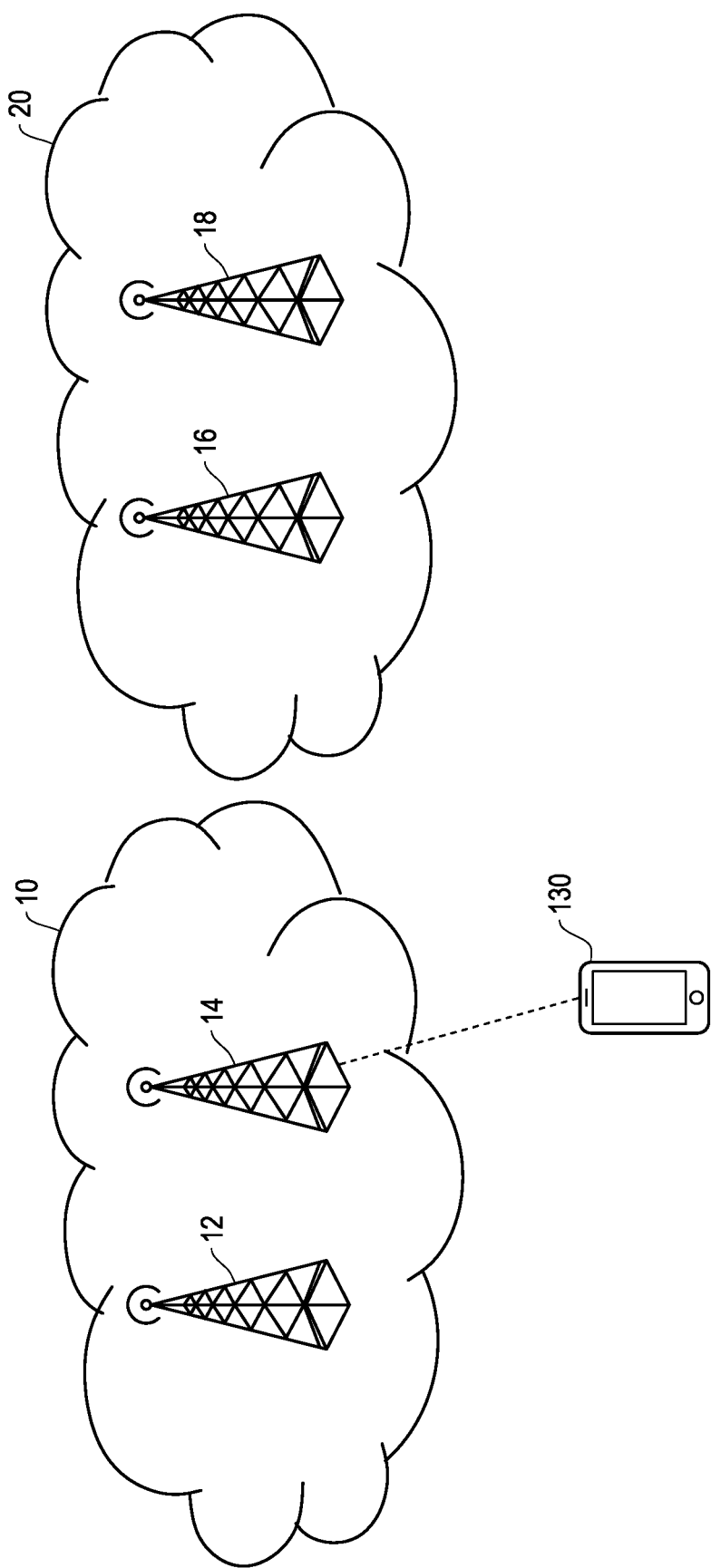
FIG. 1 is a diagram illustrating cells contained in different registration areas, according to an embodiment.
Figure 2:
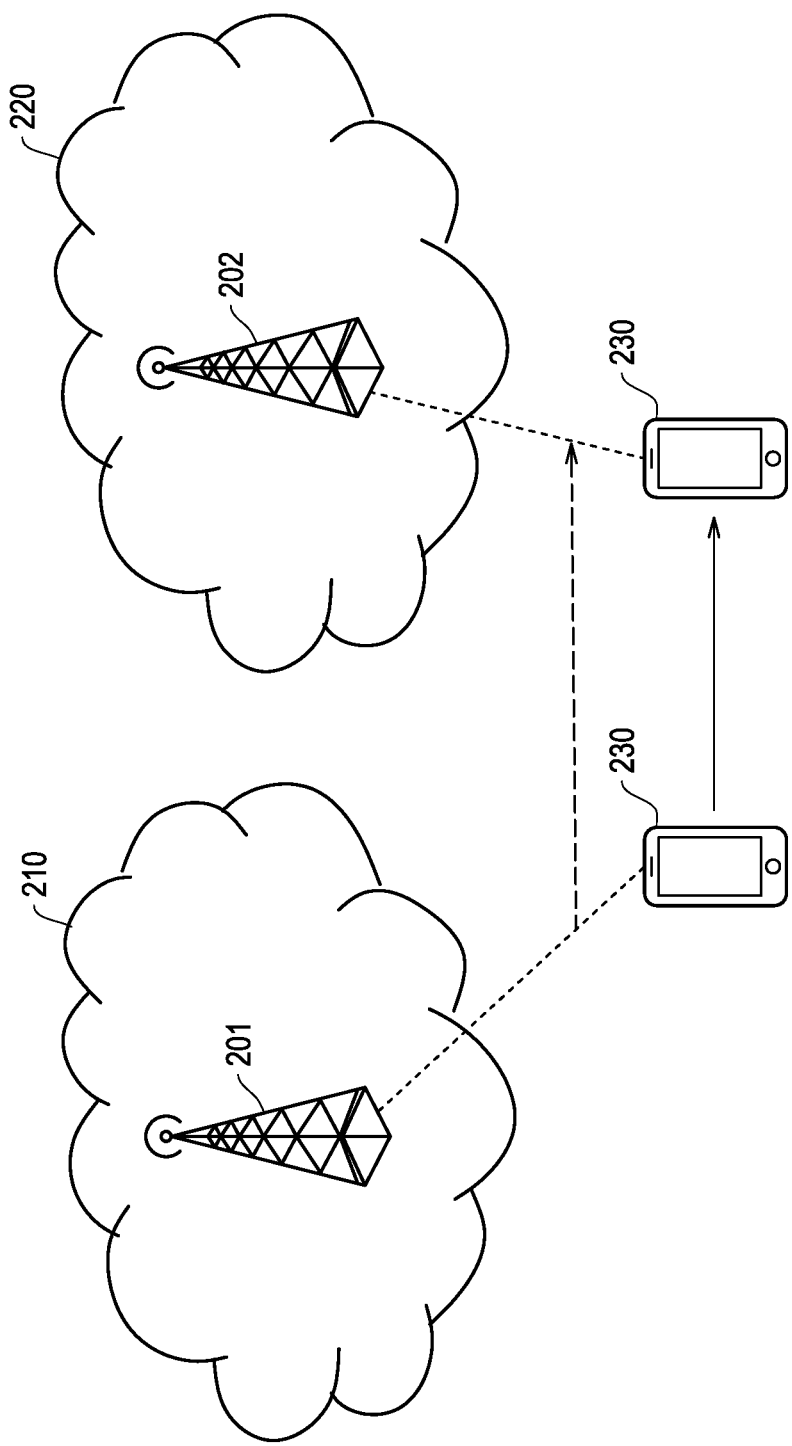
FIG. 2 is a diagram illustrating cells belonging to different PLMNs where no network sharing is used, according to an embodiment.

Below are descriptions of UEs connecting to and camping on roaming cells and how that is accomplished, and thereafter the below description, FIGS. 1-3 are illustrative examples of these systems and processes.

First, when a UE is switched on, it attempts to make contact with a Public Land Mobile Network (PLMN). The particular PLMN to be contacted may be selected either automatically or manually.

The UE looks for a suitable cell of the chosen PLMN and chooses that cell to provide available services, and tunes to its control channel. This choosing is known as "camping on the cell." The UE will then register its presence in the registration area of the chosen cell if necessary, by means of a location registration (LR), GPRS attach procedure, or LTE IMSI (International Mobile Subscriber Identity) attach procedure or 5G registration procedure.

If the UE loses coverage of a cell, or finds a more suitable cell, it selects or reselects onto the most suitable cell of the selected PLMN and camps on that new cell. If the new cell is in a different registration area, a Location Update or Tracking Area Update or Mobile Registration Update procedure is performed.

If the UE loses coverage of a PLMN, either a new PLMN is selected automatically, or an indication of which PLMNs are available is given to the user, so that a manual selection can be made. Registration is not performed by UEs only capable of services that need no registration.

Referring now to FIG. 1. FIG. 1 is a diagram illustrating cells contained in different registration areas. As an example, two registration areas are illustrated at areas 10, 20. The first registration area 10 contains two cells 12, 14, and the second registration area 20 also contains two cells 16, 18. Each cell has its own PLMN identity number that is unique from all other PLMN identities. The cells 12, 14, 16, 18 are shown using cellular tower icons and the PLMNs (i.e., the networks) 10, 20 are shown by the clouds.

In many cellular systems, the radio resource protocol states were generally divided into two groups: the idle and the connected states. In the idle state, no dedicated radio resources existed between a UE 130 and the base station or cell. In the idle state, however, the mobile station is far from being "idle." There are several idle-mode tasks it must handle, tasks such as neighbor cell monitoring, cell reselection, paging channel reception, and broadcast data reception.

While FIG. 1 illustrates that the UE 130 has connected to cell 14, the cell-reselection procedure is performed in idle mode to keep the UE 130 camped on a best cell. If the UE 130 moves or the network conditions change, it may be necessary for the UE 130 to change the cell 14 it is camped on. This procedure checks that the UE 130 is still camped on the best cell, or at least on a cell that is good enough for the UE's needs (or is within the predefined algorithm/thresholds defined for that UE).

In normal idle mode, the UE 130 has to monitor paging information and system information and perform cell measurements. The cell-selection/reselection procedure will be triggered if the measurements indicate that a better cell (e.g., a higher priority cell, a cell with higher signal strength, etc.) has been found, or if the system information of the current cell indicates that new cell access restrictions are applied to the cell in question, such as cell barred. Various System Information Block (SIB) messages are also used. For example, system information block 3 (SIB3) is an important message here because it tells the UE the quality parameter to measure, and also all the parameters for the cell-reselection evaluation algorithm. The neighbor cells to be measured are given in the neighbor cell list. In system information block 11 (SIB11), the results of these measurements are evaluated periodically. Based on these measurements the UE 130 periodically evaluates the best cell status. If it seems that there is a better cell available, it will trigger a cell reselection procedure.

Referring now to FIG. 2. FIG. 2 is a diagram illustrating cells belonging to different PLMNs where no network sharing is used. As shown, a first cell 201 has a first PLMN identity ("ID") 212 for PLMN 210 belonging to a first telecommunications operator, and a second cell 202 has a different PLMN ID 214 for PLMN 220 belonging to a second telecommunications operator. Therefore, the first and second cells 201 and 202 belong to different telecommunications operators.

Assuming a UE 230 is currently camped on the first cell 201, the UE 230 performs a periodic PLMN search for determining if there are nearby cells that have one or more PLMN identities with a higher priority. If the UE 230 determines that the second PLMN identity 214 has a higher priority than the first PLMN identity 212, the UE 230 will switch from the first cell 201 to the second cell 202 for utilizing the second cell 202 in PLMN 220 having a higher priority.

In other words, suppose the UE 230 is camping on the first cell 201. When the UE 230 finds the second cell 202 having the second PLMN identity 214 that is higher than the first PLMN identity 212 of the serving cell 201, the UE 230 will reselect the second cell 202 to camp on. This happens when the UE 230 is in idle mode with the serving cell 201 and then try to establish a connection to register with the second cell 202 of PLMN 220.

In the above example illustrated in FIG. 2, the two cells 201 and 202 do not have a common or equivalent PLMN identity. However, with network sharing becoming more popular since its introduction, new scenarios exist in which a cell can be shared among more than one operator, and therefore will have more than one PLMN identity or equivalent PLMNs with other PLMN identities of other PLMNs, as is described below.

With regard to FIG. 3. FIG. 3 is a diagram illustrating cells assigned different PLMN identities. It is noted that rectangles are used instead of clouds in FIG. 3 for ease of illustration but are no different than the clouds in FIGS. 1-2.

In FIG. 3, there are different PLMN identities 302, 303, 304 with each PLMN identity associated with respective cells 380, 360, 350, 340. Also, FIG. 3 shows that there are two networks including a first PLMN 310 operated by a first telecommunications operator and a second PLMN 320 owned by a second telecommunications operator. Each of the PLMN identities may be assigned to a different cell and/or may be assigned to a border cell between two different PLMN networks. For example, for FIG. 3, the PLMN identifies for the cells 340, 350, 360, and 380 are as follows:

(1) A first cell 360 has a PLMN identity 302 that is owned by the first operator operating the first PLMN 310.

(2) A second cell 350 is a border cell that is owned by the first operator but has two different PLMN identities 302 and 304 when network sharing is used. The first PLMN identity 302 is owned by the first operator of the first PLMN 310 and a second PLMN identity 304 is owned by a second operator that operates a second PLMN 320 (where the second PLMN 320 is separate and different from the first PLMN 310). In either event, when the UE 330 is camped on PLMN identities 302 or 304, the UE will be on the second cell 350 of the first network 310.

(3) A third cell 340 has a PLMN identity 303 that is owned by the second operator operating the second PLMN 320.

(4) A fourth cell 380 has a PLMN identity 302 that is owned by the first operator operating the first PLMN 310, which has overlapping coverage with the second PLMN 320.

Due to network sharing, the second cell 350 has different PLMN identities 302 and 304 for UEs of PLMNs 310 and 320 based on different partnership agreements. While PLMN ID 303 and PLMN ID 304 are both for UEs of PLMN 320 and configured as Equivalent HPLMN in the UE's SIM card, PLMN ID 304 indicates that the UE 330 is roaming outside of its home PLMN 320 where PLMN ID 303 indicates that the UE 330 is camped on a cell within its home PLMN 320. Also, the first cell 360 has a PLMN identity 302, while the third cell 340 has PLMN identity 303. It is noted that cell 340 is owned by the second operator in PLMN 320 and cell 380 is owned by the first operator in PLMN 310 but both have same geographic coverage, i.e. overlapping coverage.

In this regard, if the UE 330 is currently camped on the second cell 350 having PLMN identity 304, the UE 330 is utilizing PLMN network 310, as shown in FIG. 3, and the UE 330 performs a periodic PLMN search for determining if there are nearby cells that belong to PLMN identities with a higher priority. If the UE 330 detects PLMN identity 303, for example, it will determine that it does not have a higher priority than PLMN identity 304 since PLMN identity 304 and PLMN identity 303 are equivalent HPLMNs, and thus the UE 330 will not switch from cell 304 to cell 303 for utilizing the second PLMN 320 even though PLMN 320 is the UE's home PLMN. Thus, the UE 330 will stay camped on cell 304 and not switch to cell 303 even if it is moving to the overlapping coverage of cell 304 and 303, and thus, stay roaming on the first PLMN 310. This is an undesirable result for the second operator of network 320 because the UE 330 stays roaming when it could have returned to its home network (i.e., PLMN 320). This situation is shown in FIG. 3. However, the situation is different if the UE 330 is camped on PLMN ID 302 for cell 360 (or cell 350) or cell 380 if possible. Indeed, in this situation, the UE 330 determines that the PLMN identity 302, for example, has a lower priority than PLMN identity 303, and as such, the UE 330 will switch from PLMN ID 302 (cell 350 or 380 if possible) to PLMN ID 303 (cell 340) for utilizing the second PLMN 320. In this regard, the UE 330 will then return to it's home PLMN 320 which is more preferable.

For example, suppose that the UE 330 subscribes to PLMN 320 (i.e., the home network) that owns and operates the cell 340 having PLMN identity 303 but does not own cells 350, 380 or 360 having PLMN identity 302. If the UE 330 connects to the second cell 350 having PLMN identity 304, the UE 330 will be "roaming" on the first PLMN network 310 and not on the second PLMN network 320 that the UE actually subscribes to (according to some agreements between providers). In this regard, the telecommunications operator of the second PLMN 320 will pay roaming charges to the partner telecommunications operator of the first PLMN 310 because the UE 330 was roaming on the first telecommunications operator's network 310 instead of being on the UE's home network 320 that the UE 330 subscribes to. In this regard, the telecommunications operator of the second PLMN network 320 wants the UE 330 to switch back to the second PLMN network 320 as soon as possible to avoid these charges/situations. However, as mentioned above, the UE 330 will not switch to the PLMN identity 303 of the second PLMN network 320 because the PLMN identity 303 would not have a higher priority than the PLMN identity 304 or would be an equivalent HPLMN (EHPLMN) identity to PLMN identity 304.

Moreover, for many agreements between the second partner telecommunications operator (owning the first PLMN network 320) and the first partner telecommunications operator (owning the second PLMN network 310), cell reselection is only supported from the second telecommunications operator (e.g., owning the second PLMN network 320) to the first telecommunications operator (owning the second PLMN network 310), but not vice versa. In this regard, for the UE 330 to come back to the network 320 of the second telecommunications operator (e.g., to cell tower having PLMN identity 303) while moving away from the first telecommunications operator only coverage (i.e., away from cell 350), if the UE 330 is currently registered via the second cell 350 having PLMN identity 304 of PLMN 320 and is in idle mode, it can only come back to the second telecommunications operator when it is totally out of the cell 350 with PLMN identity 304 of the first telecommunications operator's coverage area, which is shown in FIG. 3 as being in area 314. This is because PLMN identity 304 and PLMN identity 303 are basically equivalent to each other as HPLMN identities and thus, the UE 330 will not see a higher priority in PLMN identity 303 relative to PLMN identity 304. In this regard, the UE 330 can only come back to the second telecommunications operator when the UE 330 is in the coverage area completely away from PLMN 320 border cells that broadcasts PLMN identity 304, which at that point, it must rescan for new PLMN identities (because the UE 330 is no longer receiving a strong signal from the second cell 350) based on a selection sequence and PLMN priority due to the configured EHPLMN list of the PLMN identities 303 and 304 and the OPLMN list of PLMN identities 302 and others the UE can roam to.

Thus, according to the present application, it is a goal for the UE 330 to move back to the subscribed telecommunications operator's PLMN network 320 as soon as possible and to do this, the algorithm for reselection on border cells should be changed.

Generally speaking, to facilitate the UE 330 coming back to the second telecommunications operator (e.g., owning the second PLMN network 320) as quickly as possible, while moving into the network of the second telecommunications operator (the second PLMN network 320), a preferred frequency shall be configured (e.g., frequency for PLMN identity 302 versus PLMN identity 304 for cell 350 in the example of FIG. 3). Thus, while the UE 330 is in the first telecommunications operator's network 310 via PLMN identity 304, the system as described herein can have the UE 330 reselect the second cell 350 to be on PLMN identity 302, as the UE 330 in first telecommunications operator's network 310 on PLMN identity 302 will then immediately reselect PLMN identity 303 while in the second operator's coverage area due to a high priority search while in VPLMN. The below description explains some embodiments in more detail.

Figure 4:
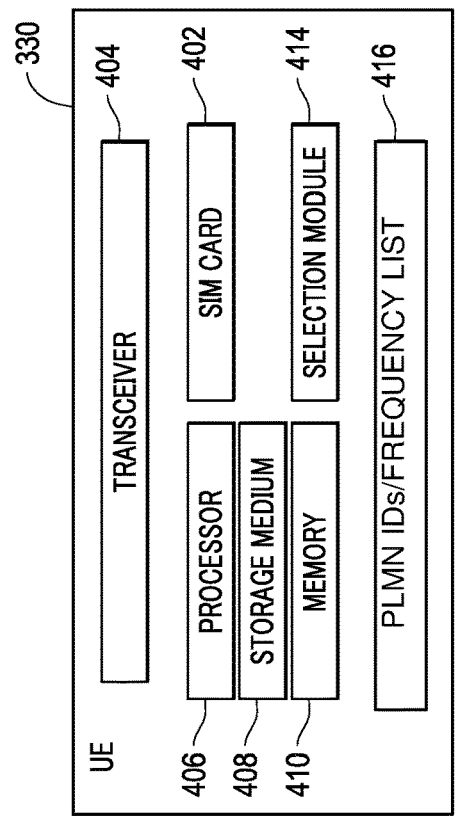
FIG. 4 illustrates an exemplary user equipment of the present system according to some embodiments.

FIG. 4 illustrates an exemplary UE 330, according to some embodiments of the present application. It should be noted that the UE 330 can be any device which is configured to connect and receive data via cells on a cellular network.

The UE 330 includes a processor 406 for processing information and executing instructions or operations. The processor 406 may be any type of general or specific purpose processor. While a single processor 406 is shown in FIG. 4, multiple processors may be utilized according to other embodiments. In fact, the processor 406 may include one or more of microprocessors, digital signal processors (DSPs"), field-programmable gate arrays ("FPGAs"), application-specific integrated circuits ("ASICs"), and processors based on a multi-core processor architecture, as examples.

The UE 330 further includes a memory 410 and storage medium 408, coupled to the processor 406, for storing information and instructions that may be executed by processor 406. The memory 410 and storage medium 408 may be one or more memories/storage mediums and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 410 and storage medium 408 can be comprised of any combination of random access memory ("RAM"), read only memory ("ROM"), static storage such as a magnetic or optical disk, or any other type of non-transitory machine or computer readable media. The instructions stored in the memory 410 and storage medium 408 may include program instructions or computer program code that, when executed by processor 406, enable the UE 330 to perform tasks as described herein.

The UE 330 may also include one or more antennas 412 for transmitting and receiving signals and/or data to the UE 330 and from the cell towers. The UE 330 may further include a transceiver 404 that modulates information on to a carrier waveform for transmission by the antenna(s) and demodulates information received via the antenna(s) for further processing by other elements of the UE 330. In other embodiments, the transceiver 404 may be capable of transmitting and receiving signals or data directly. For example, the transceiver 404 is configured to send requests and receive data (e.g., requested data, PLMN identities, etc.).

The processor 406 may perform functions associated with the operation of the UE 330 including, without limitation, any of the operations discussed in FIGS. 1-3 and 6, such as encoding and decoding of individual bits forming a communication message, formatting of information, and overall control of the UE 330, including processes related to management of communication and connection resources.

In an embodiment, the memory 410 stores software modules that provide functionality when executed by the processor 406. The modules may include an operating system that provides operating system functionality for the UE 330. The memory 410 may also store one or more functional modules 414, such as an application or program, to provide additional functionality for the UE 330. The components of the UE 330 may be implemented in hardware, or as any suitable combination of hardware and software.

In one embodiment, the UE 330 is illustrated in FIG. 4 as the user equipment of FIGS. 1-3 and 6 discussed herein, but it should be noted that the UE 330 in FIGS. 1-3 and 6 should not be limited to these embodiments of FIG. 4 and can include other or different features than the UE 330 described above. In other words, FIG. 4 is described with regard to the UE 330 for ease of illustration, but other systems could also implement the features herein.

Regardless, the UE 330 includes a PLMN selection module 414 which performs the selection of the cells using the PLMN identity broadcasted by those cells and received by the transceiver 404 of the UE 330. The PLMN selection module 414 includes algorithms and computer instructions to perform one or more of the steps described with regard to the method of FIG. 6 for cell reselection.

Figure 6:
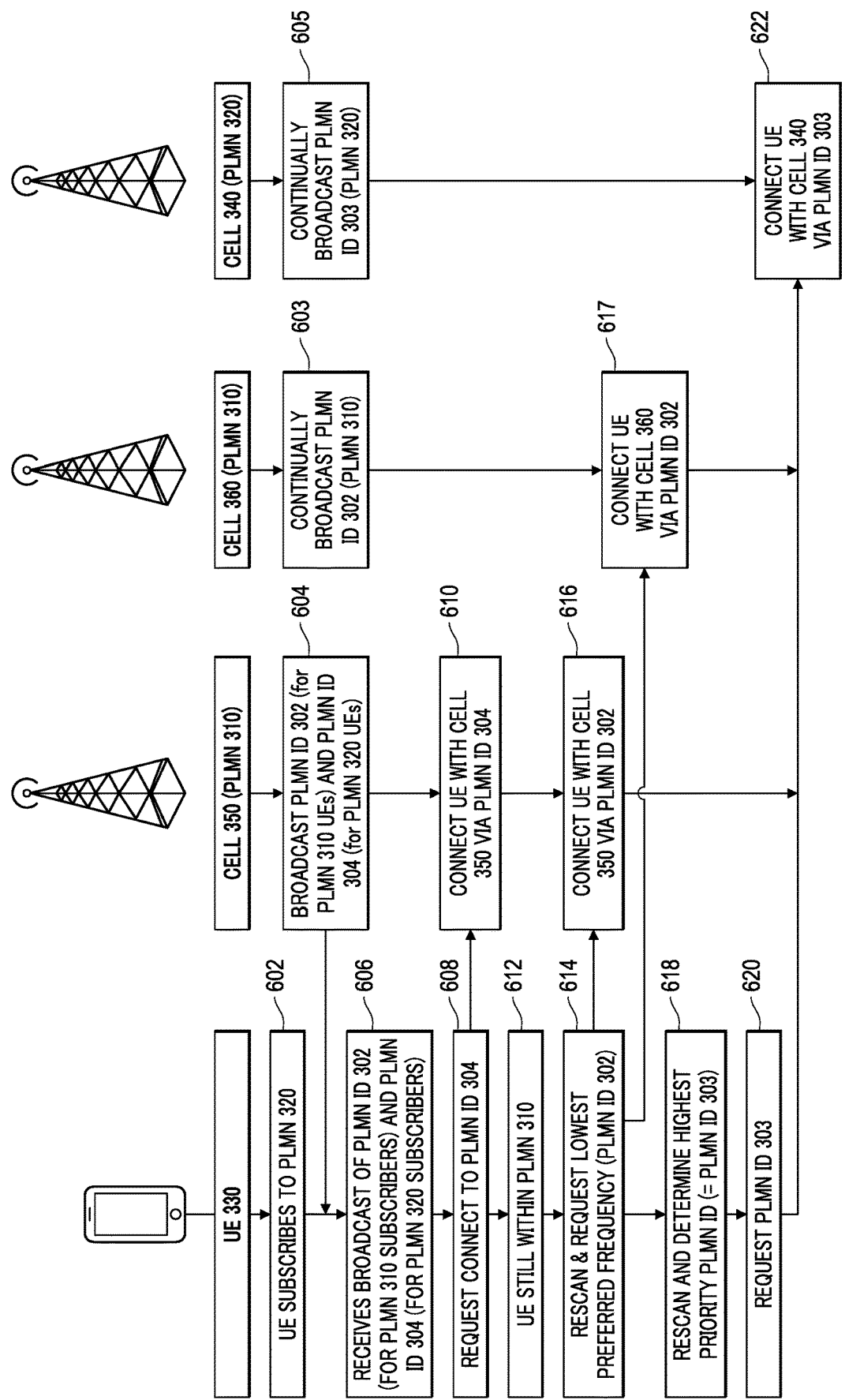
FIG. 6 illustrates a method of cell selection/reselection in accordance with an embodiment.

The UE 330 includes a SIM card 402 for storing information that is to be used for the cell selection/reselection method of FIG. 6. For example, the SIM card 402 may include information of which PLMNs it can and should connect to, the International Mobile Subscriber Identity (IMSI), etc.

From the IMSI of the SIM card 402, the home PLMN can be identified since the SIM card 402 may store such information. The home PLMN of a mobile subscriber is called HPLMN, which has subscription profiles of subscribers in the Home Location Register (HLR)/Home Subscriber Server (HSS)/Unified Data Manager (UDM). A mobile operator may have multiple PLMNs in the same country with a different mobile network code (MNC).

Every SIM card 402 has an HPLMN and/or EHPLMN, where the subscriber profile is configured. While roaming, a subscriber or the UE 330 changes its location, and this may change in roaming PLMN. The new PLMN identities may be configured as EHPLMN or as roaming PLMN identities.

Notably, HLR/HSS/UDM is the node in HPLMN, where a subscriber has all subscription information (SMS, Data, Voice), and the UE 330 keeps updating its location to the HLR/HSS/UDM during roaming. The home network has message and billing nodes and all of the above information.

In roaming, the UE 330 attaches to the core network via the access network. As mentioned briefly above, the roaming network belongs to the Visiting Public Land Mobile Network (VPLMN), and the VPLMN and HPLMN identities are different.

The SIM Card 402 in the UE 330 assists a radio module of the UE 330 in optimizing how the UE 330 scans and attaches to networks. One can achieve this by allowing the radio module to choose the best network in a given area, a function that involves PLMN lists 416 stored on the SIM card 402. Moreover, the PLMN lists 416 are based on commercial agreements (discussed above), and as such, for example, an operator will have contracts in various countries so the UE's SIM card 402 can connect to specific networks when the UE 330 roams outside of the UE's network.

The PLMN list 416 can prioritize PLMNs through the PLMN identities such as by selecting preferred frequencies over less preferred frequencies, where such frequencies are associated with particular PLMN IDs. For example, in the situation in FIG. 3, according to one embodiment, PLMN ID 302 (a network that is outside of the UE's home network and is the PLMN for UEs of PLMN 310) would have a frequency that is more preferred than PLMN ID 304 (identifying a cell that is outside of the UE's home network but is the PLMN of the UE's home network). In other words, the PLMN list 416 stored on the SIM card 402 dictates which PLMNs are priorities for the UE 330 connect to and which are most preferred.

It is noted that the SIM card 402 may be a physical SIM card or an eSIM card according to various embodiments. Moreover, SIM card 402 may be one SIM or multiple SIMs, and the above described embodiments should not be so limited.

Figure 5:
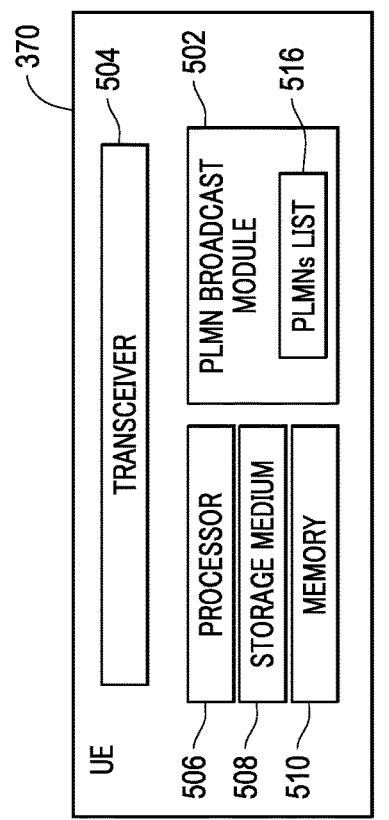
FIG. 5 illustrates an exemplary cell server of the present system, according to some embodiments

Referring briefly to FIG. 3, each of the cells 340, 350, 380, and 360 includes a cell server 370. FIG. 5 illustrates an exemplary cell server 370 of the system of FIG. 7, according to some embodiments. The cell server 370 may perform various tasks in data transmissions between the UE 330 and the cells, as is described more below. It should be noted that the cell server 370 can be any computer or server which is configured to process signals to and from the cell tower of a particular cell.

The cell server 370, as shown in FIG. 5, includes a processor 506 for processing information and executing instructions or operations. The processor 506 may be similar to processor 406 of FIG. 4 and thus, may be any type of general or specific purpose processor. While a single processor 506 is shown in FIG. 5, multiple processors may be utilized according to other embodiments. In fact, the processor 506 may include one or more of microprocessors, digital signal processors ("DSPs"), field-programmable gate arrays ("FPGAs"), application-specific integrated circuits ("ASICs"), and processors based on a multi-core processor architecture, as examples.

The cell server 370 further includes a memory 510 and storage medium 508, coupled to the processor 506, for storing information and instructions that may be executed by processor 506. The memory 510 and storage medium 508 may be one or more memories/storage mediums and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 510 and storage medium 508 can be comprised of any combination of random access memory ("RAM"), read only memory ("ROM"), static storage such as a magnetic or optical disk, or any other type of non-transitory machine or computer readable media. The instructions stored in the memory 510 and storage medium 508 may include program instructions or computer program code that, when executed by processor 506, enable the cell server 370 to perform tasks for controlling the cell tower and/or signals to/from the cell tower.

The cell server 370 may include a transceiver 504 that modulates information on to a carrier waveform for transmission by the antenna(s) and demodulates information received via the antenna(s) for further processing by other elements of the cell server 370. In other embodiments, the transceiver 504 may be capable of transmitting and receiving signals or data directly to the UE via the cell towers. For example, the transceiver 504 is configured to send requests and receive data (e.g., requested data, PLMN identities, etc.). This is accomplished by the transceiver being connected to the cell tower for transmission of such data.

The processor 506 may perform functions associated with the operation of the cell server 370 such as processing signals sent to and from the cell tower, selecting controlling broadcasting of PLMN identities, and overall control of the cell tower and the cell server 370.

In an embodiment, the memory 510 stores software modules that provide functionality when executed by the processor 506. The modules may include an operating system that provides operating system functionality for the cell server 370. The memory 510 may also store one or more functional modules, such as an application or program, to provide additional functionality for the cell server 370. The components of the cell server 370 may be implemented in hardware, or as any suitable combination of hardware and software.

Regardless, the cell server 370 includes a PLMN broadcast module 502 which broadcasts the PLMN identity to any UEs to receive in the area. The PLMN broadcast module 502 broadcasts the PLMN identities 516, as is predetermined by the network operator and in compliance with the partnership agreements with other network operators. If the cell is located in a border cell area of the first and second telecommunications operators' area (and there is an agreement between the first and second telecommunications operators), the PLMN identities 516 that will be broadcast may be those for both the first and second telecommunications operators (e.g., PLMN identity 302 for PLMN 310 and PLMN identity 304 for PLMN 320 where PLMN identity 304 and PLMN identity 303 may be equivalent HPLMN IDs). However, if the cell is located in only the first telecommunications operator's area or the overlapping area, the PLMN identity (ies) 516 that will be broadcast will be that for the first telecommunications operator only.

In this regard, the PLMN identities 516 to be broadcast are predetermined by the network operator and saved in memory 510 and/or in the PLMN broadcast module 502. These PLMN identities 516 will be continually broadcasted by a respective cell tower associated with those PLMN identities 516. The PLMN identities list 516 may be different for different cells but are associated with both the cell and the network of the cell. For example, in FIG. 3, PLMN 310 has two PLMN identities 302 and 304 where PLMN identity 302 corresponds to the cell 340 and 350 and PLMN identity 304 corresponds to cell 350, while PLMN 320 only has PLMN identity 303. Thus, at cell 360 the PLMN identity list 516 stored at the associated cell tower server 370 is PLMN identity 303, while at cell 350 the PLMN identity list 516 stored at the associated cell tower server 370 is PLMN identity 302 and PLMN identity 304.

Figure 7:
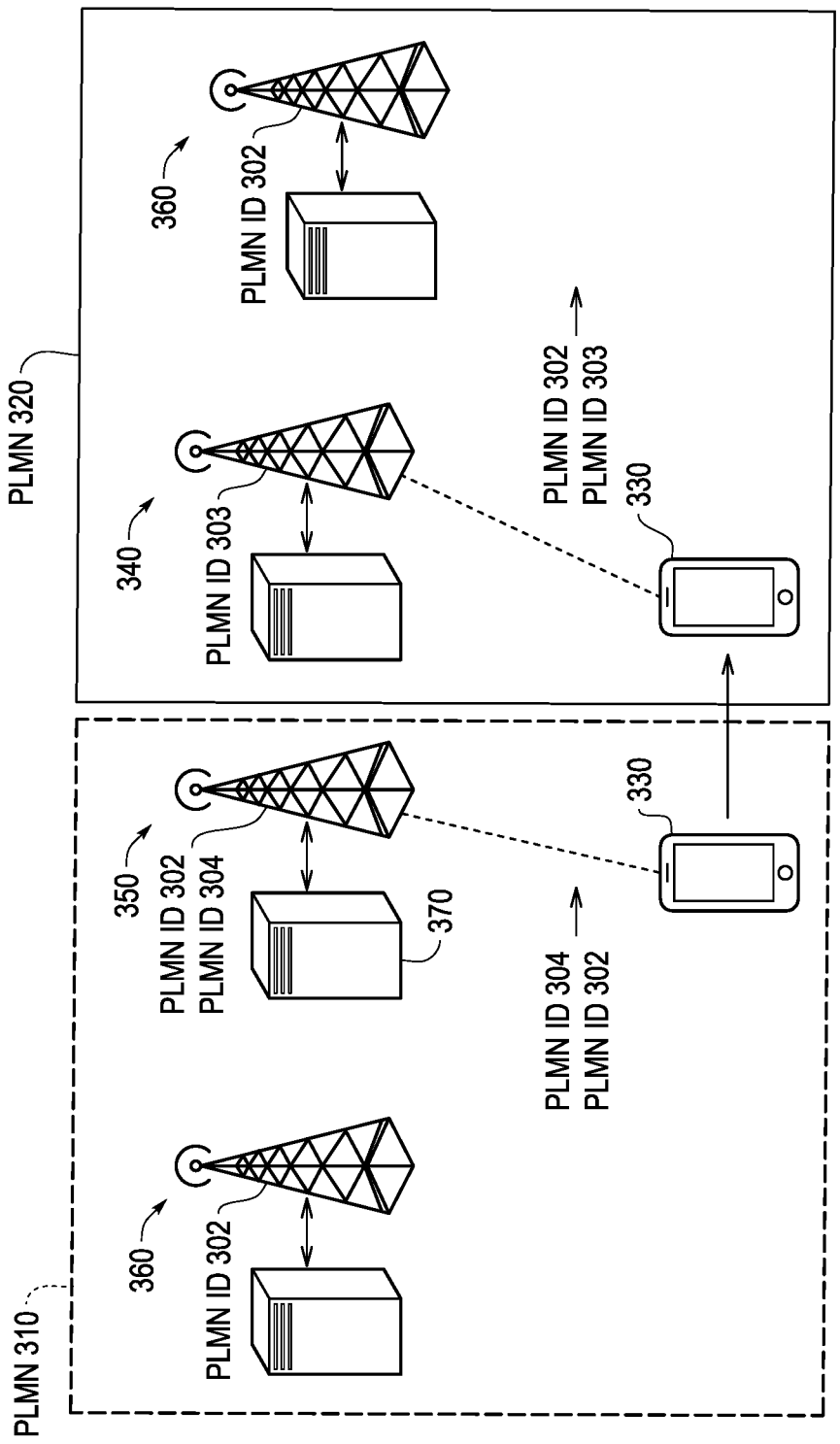
FIG. 7 illustrates a diagram of systems implementing cell selection/reselection, according to some embodiments.

FIG. 6 illustrates a method of cell selection/reselection in accordance with an embodiment, and FIG. 7 illustrates a diagram of systems implementing cell selection/reselection, according to some embodiments.

Referring to FIGS. 6 and 7, the UE 330 subscribes to PLMN 320, as provided in step 602. In step 604, cell 350 continually broadcasts PLMN identities 302 and 304. As mentioned above, PLMN identity 302 is for subscribers of PLMN network 310 and PLMN identity 304 is for subscribers of PLMN network 320. Cell 350 is a border cell that is in PLMN 310 servicing both PLMN identity 302 and 304. In other words, UEs 330 camped on the cell 350 owned solely by the operator of PLMN 310 can be on PLMN identity 302 or 304 and thus, the UE 330 would be roaming connecting to cell 350 via either PLMN identities 302 or 304 since the UE's home PLMN is 320.

In steps 603 and 605, cells 360 and 340 continually broadcast PLMN identities 302 and 303, respectively, similar to cell 350 relating to step 604. This occurs throughout all of the steps shown in FIG. 6 so that whenever the UE 330 is within the broadcast signals of cells 340 and 360, the broadcasts of these PLMN identities will be received by the UE 330 for the UE 330 to possibly connect to one of these cells.

In step 606, the UE 330 receives the broadcast of PLMN identities 302 and 304 because the UE 330, for example, is only close enough to cell 350. In step 608, the UE 330 will then initially request to connect with PLMN 310 via PLMN identity 304 since PLMN identity 304 is the Equivalent HPLMN identity for subscribers of PLMN 320.

It is noted that the UE 330 receives both PLMN identities 302 and 304 and initially and historically, PLMN identity 304 is a higher priority than PLMN identity 302 because PLMN identity 304 is configured as UE's Equivalent HPLMN of PLMN 320. Thus, UE 330 initially connects via PLMN 304. Or in other case where the UE can be allowed only to PLMN 304 from PLMN 303 during mobility from the PLMN 320 to PLMN 310 based on roaming agreement.

In response to receiving the connection request, cell 350 then allows the UE 330 to connect to it via PLMN ID 304, as provided in step 610.

At this point, the UE 330 is roaming on PLMN 310 because cell 350 is owned by operators of PLMN 310 and the UE's home network is PLMN 320. It is, thus, desirable to get the UE 330 to come back to its home PLMN 320 which is part of a network which the UE 330 subscribes to.

To accomplish this, once the UE 330 camped on cell 350 (step 612) via PLMN ID 304, based on the radio frequency selection priority index from the roaming cell 350, the UE 330 will determine the most preferred frequency. In this regard, the UE 330 will then select a preferred frequency predetermined for visiting PLMNs (e.g., a frequency associated with PLMN ID 302). This is accomplished according to a predetermined methodology based on knowing the PLMN IDs for various partner operators and the frequencies associated with their home PLMN IDs. In this regard, the most preferred frequency in VPLMN is that which is associated with the PLMN ID as the UEs roaming PLMN ID. For example, for cell 350, the preferred frequency will be that associated with PLMN 302 because PLMN 302 is configured as roaming PLMN ID for UEs. Thus, in step 614, the UE 330 will choose PLMN identity 302 over PLMN identity 304 even though PLMN identity 304 is provided for UEs of PLMN 320. In one embodiment, this is performed when the UE 330 has selected a cell that is owned by an operator that is outside of the UE's subscribed network (i.e., the UE 330 is a visitor on PLMN 310 via cell 350). In other words, the UE 330 will perform 614 anytime it is camped on a VPLMN, according to an embodiment. In one embodiment, this is performed when the UE is camped on a border cell (i.e., a cell via which the UE is leaving home network PLMN 320 and entering another operators network PLMN 310).

Next, in step 616 and as shown in FIG. 7, the UE 330 will be camped on cell 350 under PLMN identity 302 (and/or be connected with cell 360 via PLMN 302, as provided in step 617). In this regard, because the UE 330 is connected with a lower priority PLMN identity (i.e., PLMN 302) relative to PLMN 303, as defined in PLMN identity list 416, and when the UE 330 gets closer to another cell (e.g., cell 340) within its home network (i.e., PLMN 320), the UE 330 will want to connect with the HPLMN identity over the lower currently-connected VPLMN identity.

At this point, the UE 330 is connected to PLMN identity 302 as a visitor. In step 618, the UE 330 now rescans in order to perform cell reselection. In one embodiment, this process occurs automatically after step 616/617. Also, in step 618, the UE 330 determines the highest priority PLMN identity based on the rescan. In this case of FIG. 7, the UE 330 receives two PLMN identities—PLMN identity 302 (which it is currently camped on) and PLMN identity 303 which is now in range of UE 330. In this situation the UE 330 determines, based on the PLMN list 416 stored in memory, determines that PLMN identity 303 has a higher priority than PLMN identity 302 since PLMN identity 302 is a visiting PLMN and PLMN identity 303 is in the UEs home PLMN.

After the UE 330 determines that the highest priority PLMN identity is PLMN identity 303 (step 618), the UE 330 is connected with cell 340 which is associated with PLMN identity 303. This is shown in step 620 where the UE 330 then requests connecting to cell 340 via PLMN identity 303 and in step 622 when the UE 330 is actually connected with cell 340. Moreover, this is also illustrated in FIG. 7 where the UE 330 is shown being shifted from PLMN identity 302 to PLMN identity 303 and thus, from PLMN 310 to 320.

In this regard, the UE 330 was transferred quickly from PLMN 310 to 320 using the preferred frequency and a highest priority search while in the VPLMN.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method for cell reselection comprising:
receiving, by user equipment (UE) comprising a processor, a broadcast of PLMN identities on a PLMN list from a first cell that includes a first Public Land Mobile Network (PLMN) identity associated with a visiting PLMN (VPLMN) and a second PLMN identity associated with a home PLMN (HPLMN);
determining and selecting the first PLMN identity based on a predefined preferred frequency between the first PLMN identity and the second PLMN identity, wherein the predefined preferred frequency associated with the first PLMN identity is determined from the PLMN list that includes preferred frequencies and prioritizes PLMNs by selecting preferred frequencies over less preferred frequencies from the broadcast;

rescanning for PLMN identities being broadcast on a different PLMN list from second cell and detecting a third PLMN identity of the HPLMN on the different PLMN list that includes different preferred frequencies;

determining that the third PLMN identity has a highest priority between (1) the first PLMN identity, as the previously determined preferred frequency, and (2) the third PLMN identity based on a frequency selection priority from the different PLMN list of the second cell; and connecting to the third PLMN identity.

2. The method of claim 1, further comprising:
connecting to the first cell using the second PLMN identity; and
in response to the UE moving away from the first cell, performing the selecting the first PLMN identity as the predefined preferred frequency.

3. The method of claim 2, wherein the selecting the first PLMN identity as a predefined preferred frequency occurs after the connecting to the first cell using the second PLMN identity.

4. The method of claim 1, wherein the UE is a subscriber to the HPLMN.

5. The method of claim 4, wherein the first cell is a part of the VPLMN.

6. The method of claim 1, wherein the determining the preferred frequency comprises selecting the lower of two PLMN identity priorities instead of the higher of the two PLMN identity priorities.

7. The method of claim 6, wherein the determining the preferred frequency occurs in response to the UE moving away from the first cell.

8. The method of claim 6, wherein the determining the preferred frequency occurs in response to the UE detecting the third PLMN identity.

9. User equipment (UE) comprising:
an antenna to connect with cells, the antenna being configured for receiving a broadcast of PLMN identities on a PLMN list from a first cell that includes a first Public Land Mobile Network (PLMN) identity associated with a visiting PLMN (VPLMN) and a second PLMN identity associated with a home PLMN (HPLMN);
memory; and
a processor configured for:
determining and selecting the first PLMN identity as a predefined preferred frequency between the first PLMN identity and the second PLMN identity, wherein the predefined preferred frequency associated with the first PLMN identity is determined from the PLMN list that includes preferred frequencies and prioritizes PLMNs by selecting preferred frequencies over less preferred frequencies from the broadcast;
detecting a third PLMN identity of the HPLMN on the different PLMN list that includes different preferred frequencies;
determining that the third PLMN identity has a highest priority between (1) the first PLMN identity, and (2) the third PLMN identity based on a frequency selection priority from the different PLMN list of the second cell; and
connecting to the third PLMN identity.

10. The user equipment of claim 9, wherein the processor is further configured for:
connecting to the first cell using the second PLMN identity; and
in response to the UE moving away from the first cell, performing the selecting the first PLMN identity because the first PLMN identity is associated with the predefined preferred frequency.

11. The user equipment of claim 10, wherein the selecting the first PLMN identity as a predefined preferred frequency occurs after the connecting to the first cell using the second PLMN identity.

12. The user equipment of claim 9, wherein the UE is a subscriber to the HPLMN, and wherein the first cell is a part of the VPLMN.

13. The user equipment of claim 9, wherein the determining the preferred frequency occurs in response to determining that the UE is camped on a call that is in a visitor PLMN.

14. The user equipment of claim 9, wherein the determining the preferred frequency occurs in response to the UE detecting the third PLMN identity.

15. A system comprising:
a processor configured for:
receiving a broadcast of PLMN identities on a PLMN list from a first cell that includes a first Public Land Mobile Network (PLMN) identity and a second PLMN identity;
determining and selecting the first PLMN identity as a predefined preferred PLMN identity between the first PLMN identity and the second PLMN identity, wherein the predefined preferred frequency associated with the first PLMN identity is determined from the PLMN list that includes preferred frequencies and prioritizes PLMNs by selecting preferred frequencies over less preferred frequencies from the broadcast;
detecting a third PLMN identity of a second cell on the different PLMN list that includes different preferred frequencies;
determining that the third PLMN identity has a highest priority between the first PLMN identity and the third PLMN identity based on a frequency selection priority from the different PLMN list of the second cell; and
connecting to the third PLMN identity.

16. The system of claim 15, wherein the processor is further configured for:
connecting to the first cell using the second PLMN identity; and
in response to a determination of the UE roaming from the UE's home PLMN, performing the selecting the first PLMN identity as the predefined preferred PLMN identity.

17. The system of claim 16, wherein the selecting the first PLMN identity as the predefined preferred PLMN identity occurs after the determining that the first PLMN identity is a PLMN identity for UEs of the first PLMN.

18. The system of claim 16, wherein the system comprises a computing device that is a subscriber to a network of the second cell, but not a subscriber of the first PLMN.

19. The system of claim 18, wherein the determining the preferred PLMN comprises selecting a PLMN identity of the first PLMN instead of a PLMN identity associated with the UE's home network.

20. The system of claim 16, wherein the determining the preferred PLMN identity occurs by retrieving a PLMN list which indicates how to select which of two PLMNs is the preferred PLMN.

\* \* \* \* \*